A. UNGERER.
Apparatus for Evaporating Brine, Acids, and Alkalies.
No. 146,728.  Patented Jan. 20, 1874.
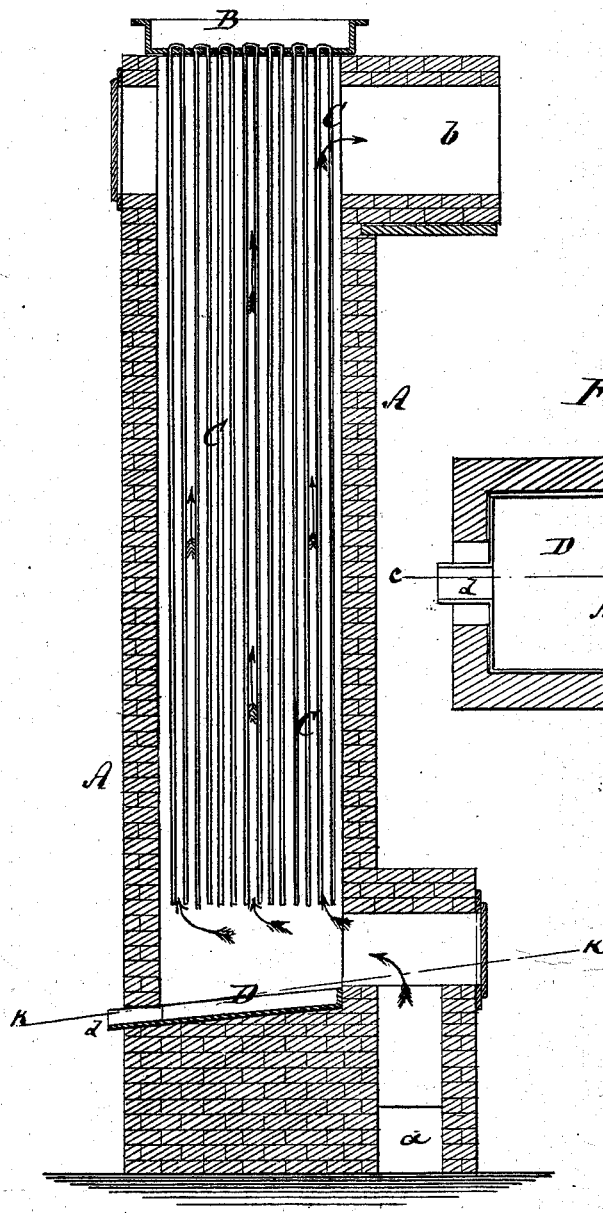
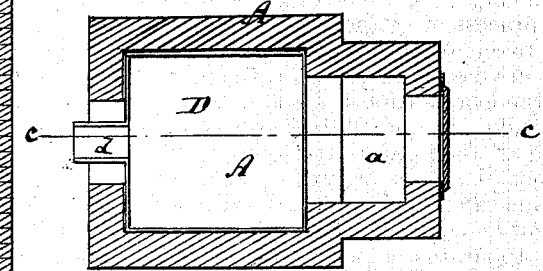

UNITED STATES PATENT OFFICE.

ALBERT UNGERER, OF SIMMERING, NEAR VIENNA, AUSTRIA.

IMPROVEMENT IN APPARATUS FOR EVAPORATING BRINE, ACIDS, ALKALIES, &c.

Specification forming part of Letters Patent No. 146,728, dated January 20, 1874; application filed April 17, 1873.

*To all whom it may concern:*

Be it known that I, ALBERT UNGERER, of Simmering, near Vienna, Austria, have invented an Improved Evaporating Apparatus, of which the following is a specification:

The object of this invention is to facilitate the process of evaporating liquid substances, and to economize fuel during such evaporation. The invention is more particularly intended for the evaporation of sulphuric acid, brine, or other liquids, and of alkalies used in the treatment of wood-pulp, straw-pulp, and whenever, in fact, the gases or air for evaporating such liquids can be used without obstruction. My invention consists in using for such evaporating apparatus a series of vertical rods or strings, which are suspended from the perforated bottom of a pan into a vertical shaft or well, and along which the liquid contained in the pan will slowly flow downward, being, while thus in contact with such rods, ropes, or strings, exposed to currents of air, heated or other gases, by which the evaporation is to be effected.

By a judicious arrangement of these strings, and especially by making them of proper length, immensely large surfaces for evaporating liquids can be obtained in a comparatively small apparatus.

In the accompanying drawing, Figure 1 represents a vertical sectional view of my improved evaporating apparatus, the line C C, Fig. 2, indicating the plane of section. Fig. 2 is a horizontal section thereof on the line K K, Fig. 1.

Similar letters of reference indicate corresponding parts.

The letter A represents a vertical shaft or structure of suitable dimensions, built of brick or other material, and made with an air or gas supply opening, $a$, at its lower part, and with an opening, $b$, for the escape of the air or gas at its upper part. The top of the opening in the shaft A is closed by a pan, B, whose bottom is perforated, and through the perforations of this bottom are drawn strings, cords, wire-ropes, sticks, or bars, C, of suitable material, which extend down vertically into the shaft A, as clearly shown in Fig. 1.

The liquid to be evaporated is poured into the pan B, and slowly trickles on the ropes or rods C, being, while moving thereon, exposed to the ascending currents of air or gases which pass through the shaft in the direction indicated by arrows in Fig. 1. The direction of the air or gases may, however, be reversed. The process of evaporation is thus rapidly and fully effected. Any liquid not evaporated will be collected at the bottom of the shaft in a pan, D, there placed for its reception, and carried off through a spout, $d$.

What is here claimed, and desired to be secured by Letters Patent, is—

The evaporating apparatus consisting of the vertical shaft A, the perforated pan or trough B resting on the top thereof, and the rods, cords, or wires C, suspended from the bottom of the pan B by passing through the perforations and hanging vertically in the shaft A, all combined and arranged as shown and described, for the purpose specified.

ALBERT UNGERER.

Witnesses:
J. B. KIRSCH,
F. WIRTH.